Patented Mar. 13, 1934

1,950,440

UNITED STATES PATENT OFFICE 1,950,440

HALOGEN-SUBSTITUTED CHEMICAL COMPOUNDS AND PROCESSES FOR PREPARING SAME

Ralph A. Jacobson, Wilmington, Del., assignor to E. I. du Pont de Nemours & Company, Wilmington, Del., a corporation of Delaware No Drawing. Application October 19, 1931, Serial No. 569,833

37 Claims. (Cl. 260—162)

This invention relates to new chemical compounds and their method of preparation. More particularly the invention relates to substituted chlorobutadienes.

Prior art

Monovinylacetylene was first discovered by Willstäter and Wirth (Berichte 46, 535) and prepared by exhaustive methylation of 1,4-tetramethyl-diaminobutene-2. More recently, an improved process of preparation has been discovered by Nieuwland U. S. application Serial No. 305,806, filed September 13, 1928, who reacts acetylene in the presence of a cuprous catalyst and a nitrogen base to obtain a mixture of acetylene polymers containing monovinylacetylene which may be separated by distillation.

The preparation of chloro-2-butadiene-1,3 ($CH_2=CCl—CH=CH_2$) by the combination of monovinylacetylene and hydrogen chloride under a variety of conditions is disclosed in an application of Carothers and Collins, Serial No. 490,538, filed October 22, 1930. In a second application of Carothers and Collins, Serial No. 519,243, filed February 28, 1931, the polymerization of chloro-2-butadiene-1,3 to obtain products varying from liquids boiling below 100° C. (under 27 mm. pressure) to hard resinous solids is disclosed. In an application of Williams, Serial No. 519,244, filed February 28, 1931, a process for preparing a plastic, rubber-like polymer from chloro-2-butadiene-1,3 has been disclosed. In applications by Carothers, Collins and Kirby, Serial Nos. 519,241 and 519,242, filed February 28, 1931, processes of controlling the polymerization of chloro-2-butadiene-1,3 are disclosed.

In an application of Carothers and Kirby, Serial No. 535,577, filed May 6, 1931, are disclosed methods of controlling the polymerization of chloro-2-butadiene-1,3 by means of sulfur or certain sulfur compounds such as the thiuramdisulfides. Finally in an application of Collins, Serial No. 537,484, filed May 14, 1931, are disclosed methods of preparing emulsions of chloro-2-butadiene-1,3 and its polymers.

Objects of invention

An object of the invention relates to homologs and analogs of chloro-2-butadiene-1,3 and to various methods of preparing the same. A further object of the invention refers to new and useful products derived therefrom and to processes for preparing these products.

Description of present invention

In accordance with the present invention, it has been found that hydrogen halides add to substituted monovinylacetylenes of the general formula, $CH_2=CH—C\equiv C—R$, to give substituted halogen butadienes having the general formula, $CH_2=CH—CX=CHR$, in which X is a halogen atom, and in which R is a carbon-containing radical such as alkyl, aryl, and heterocyclic residues. These products are new and possess properties similar to chloro-2-butadiene-1,3. The substituted acetylenes from which they are derived are also new compounds and methods of preparing them are described in a co-pending application of Carothers and Jacobson, Serial No. 574,359, filed November 11, 1931.

Inasmuch as the R group of the substituted monovinylacetylene can be varied at will, it is possible to produce 1-substituted-chloro-2-butadiene-1,3 of widely varying composition. This is highly advantageous since such properties as stability, boiling point, solubility, and tendency to polymerize have been found to depend upon the size and type of the substituent R group. Similarly certain properties of the partially and completely polymerized R substituted derivatives of chloro-2-butadiene-1,3 have been found to be related directly to the size and type of the substituent R group. Particularly this is true of the speed of polymerization; the solubility, volatility, and plasticity of the partially polymerized product, and the elasticity, resiliency, and strength of the completely polymerized rubber-like final products. It is thus possible to control in large measure not only the properties of the substituted chloro-2-butadienes-1,3 but also the properties of the partially and completely polymerized products derived therefrom. The following examples are cited to illustrate typical new 1-substituted-chloro-2-butadienes-1,3 which have been prepared:

(1) Methyl-1-chloro-2-butadiene-1,3,
$CH_2=CH—CCl=CHCH_3$
(2) Ethyl-1-chloro-2-butadiene-1,3,
$CH_2=CH—CCl=CHC_2H_5$ (3) Butyl-1-chloro-2-butadiene-1,3,
 $CH_2=CH-CCl=CHC_4H_9$
(4) Heptyl-1-chloro-2-butadiene-1,3,
 $CH_2=CH-CCl=CHC_7H_{15}$ Likewise the addition of hydrogen halides to vinylacetylenes, which are substituted in the alpha position with groups other than alkyl, may take place in a similar manner. Thus one might employ phenyl-1-vinyl-2-acetylene, allyl-1-vinyl-2-acetylene, cyclohexyl-1-vinyl-2-acetylene, and other vinylacetylenes containing a substituent R group in the 1-position. In general, the R group may be any hydrocarbon group, e. g., an alkyl group, such as methyl, ethyl, heptyl, lauryl, an unsaturated hydrocarbon chain such as allyl, an aromatic group such as phenyl, naphthyl, tolyl or xlyl, a saturated cyclic hydrocarbon ring such as cyclohexyl or cyclopentyl, a mixed armamatic-aliphatic chain such as benzyl or xylenyl, or other common hydrocarbon chains, saturated or unsaturated, and branched or unbranched. The R group may also be a heterocyclic ring such as a furfuryl or pyridyl radical.

The structure of the substituted chloro-butadienes is established by the fact that upon condensation with naphthoquinone, followed by oxidation, 1-substituted-chloro-2-anthraquinones-9,10 are obtained in each instance. The following equation is illustrative:

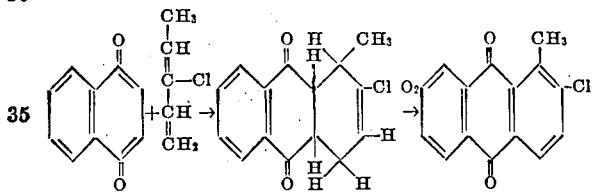

It should be emphasized that while in the following examples only products derived from the addition of hydrogen chloride are described, other hydrogen halides behave similarly. Thus, from hydrogen bromide, hydrogen iodide, and hydrogen fluoride would be obtained respectively 1-substituted-bromo-2-butadiene-1.3, 1-substituted-iodo-2-butadiene-1,3 and 1-substituted-fluoro-2-butadiene-1,3. The processes are in general analogous to the preparation of the corresponding chloro products. The same catalysts and general methods may be used and the observations made in connection with the preparation of the corresponding chlorine product, as to possible variations in the preferred conditions and catalysts, apply.

It has been found that the substituted butadienes are susceptible to polymerization and that the polymerized products are similar in properties to chloro-2-butadiene-1,3 polymer, i. e., bear marked resemblance to rubber. Thus, samples of rubber-like polymers have been made from methyl-1-chloro-2-butadiene-1,3, ethyl-1-chloro-2-butadiene-1.3, and other similar butadienes by various methods hereinafter described, the resulting polymers being utilized for the preparation of artificial rubber in a manner to be described later.

The R-substituted chloro-butadienes are prepared from the corresponding R-substituted monovinylacetylenes, which in turn are preferably prepared by the interaction of alkali metal vinyl acetylides with alkyl halides, alkyl sulfates, alkyl sulfonates, etc. This mode of preparation is illustrated by the following unbalanced equations:

$CH_2=CH-C \equiv CM + SO_4R_2 \rightarrow$
$CH_2=CH-C \equiv CR \xrightarrow{HCl} CH_2=CH-CCl=CHR$ $CH_2=CH-C \equiv CM + XR \rightarrow$
$CH_2=CH-C \equiv CR \xrightarrow{HCl} CH_2=CH-CCl=CHR$ (X indicating a halogen atom)

$CH_2=CH-C \equiv CM + CH_3C_6H_4SO_3R \rightarrow$
$CH_2=CH-C \equiv CR \xrightarrow{HCl} CH_2=CH-CCl=CHR$ The preparation of the R-substituted monovinyl acetylenes forms no part of the present invention, and it will be understood that the invention may be practiced by forming hydrogen halide addition products of R-substituted monovinyl acetylenes prepared by processes other than the interaction of alkali metal vinyl acetylides and esters of sulfonic, sulfuric and hydrohalogen acids.

The preferred procedure for the preparation of these compounds involves shaking or stirring the substituted vinyl acetylene with a concentrated aqueous solution of hydrogen chloride and a mixture of cuprous and ammonium chlorides. The period of agitation necessary to effect addition of the hydrogen chloride varies considerably depending upon the particular substituted vinyl acetylene employed. Likewise, the temperature may vary over wide limits, room temperature being suitable in some instances, while in other cases temperatures of 100° C. or higher are necessary. In general, increasing the temperature accelerates the rate of addition. The preparation of illustrative compounds of the type discussed above is described in full in the following examples:

EXAMPLE I

Methyl-1-chloro-2-butadiene-1,3

Forty-four (44) grams of methyl-1-vinyl-2-acetylene was placed in a pressure bottle containing a mixture composed of 121 cc. of concentrated hydrochloric acid (sp. gr. 1.19), 17.4 g. cuprous chloride, and 7 g. of ammonium chloride. The bottle was shaken at 22° C. for five hours, and the contents distilled with steam. The non-aqueous layer was separated, dried with calcium chloride, a small amount of hydroquinone added, and the liquid was then distilled. The distillate consisted of unchanged methyl-1-vinyl-2-acetylene and the new compound, methyl-1-chloro-2-butadiene-1,3. The latter was a colorless liquid of characteristic odor, $B_{759\,mm}$. 99.5–101.5° C.; $N\frac{20°\,C.}{D}1.4785$;

$D\frac{20°\,C.}{4°\,C.}0.9576.$

A small amount of hydroquinone was added to inhibit spontaneous polymerization to a rubber-like solid.

Although methyl-1-chloro-2-butadiene-1,3 can be readily prepared by the above procedure, other methods of preparation can be employed. The combination of hydrogen chloride and methyl-1-vinyl-2-acetylene can be effected under a variety of conditions and in the complete absence of an added catalyst but it is favorably controlled and accelerated by certain catalysts such as the metallic halides. Among the metallic chlorides may be mentioned mercuric, mercurous magnesium, calcium, auric and cuprous chlorides. The course of the reaction is also favorably affected by the presence of ammonium chloride or a substituted ammonium chloride, exemplified by pyridinium chloride, methyl ammonium chloride, diethyl ammonium chloride, tributyl ammonium chloride, and tetraamyl ammonium chloride. The ammonium chloride or substituted ammonium chloride may be added as such to the acid reaction mixture or alternatively may be formed in situ by the addition of a suitable ammonia compound. Furthermore, in place of aqueous hydrochloric acid, dry hydrogen chloride may be employed. In this case, it is desirable to use a solution of the substituted vinylacetylene, for example, an ethereal or alcoholic solution of methyl-1-vinyl-2-acetylene as described in Example IV below. Solvents other than ether or alcohol, e. g., ethoxyethanol, diethylene glycol, hexane, octane, ethyl acetate, etc., may be employed.

The combination of hydrogen chloride and methyl-1-vinyl-2-acetylene may also be effected in continuous fashion by filling a vessel with a catalyst solution of the type described and introducing methyl-1-vinyl-2-acetylene in liquid or gaseous form. Under the latter condition, either a higher temperature or a lower pressure is advisable to vaporize the alkyl-1-vinyl-2-acetylene. The resulting crude methyl-1-chloro-2-butadiene-1,3 rises to the surface where it is collected or allowed to flow into a container. The combination of methyl-1-vinyl-2-acetylene with hydrochloric acid in the presence of cuprous and ammonium chlorides can also be effected in a jacketed autoclave provided with a stirrer.

Certain other changes in the procedure of Example I can also be effected without changing the essential results. Thus, instead of distilling the crude reaction product with steam, separation of the aqueous and non-aqueous portions may be effected by mechanical means, for example, in a separatory funnel. The reaction may be run at higher or lower temperatures than that specified. The amount or the concentration of the hydrochloric acid may be increased or varied from a highly concentrated solution to a comparatively dilute solution, and the concentration and nature of the catalyst may also be changed in a similar manner.

In general, the addition of an inhibitor such as hydroquinone, catechol, or pyrogallol to the final product is advisable if it is to be retained in the monomeric form. In the absence of such an antioxidant, spontaneous polymerization to a rubber-like material is likely to occur. Other antioxidants or inhibitors may be selected for this purpose, such as trinitrobenzene, iodine, diphenyl guanidine and m-toluylenediamine. The use of inhibitors will be more fully discussed below.

EXAMPLE II

*Ethyl-1-chloro-2-butadiene-1,3*

Forty-four (44) grams of ethyl-1-vinyl-2-acetylene was placed in a pressure bottle containing a mixture composed of 100 cc. concentrated hydrochloric acid (sp. gr. 1.19), 14.3 g. cuprous chloride, and 5.7 g. ammonium chloride. The bottle was shaken at 23° C. for five hours, and the contents distilled with steam. The non-aqueous layer was separated, dried with calcium chloride, a small amount of hydroquinone was added, and the liquid distilled in a vacuum. The distillate consisted of unchanged ethyl-1-vinyl-2-acetylene, the new compound ethyl-1-chloro-2-butadiene-1,3, and a small amount of higher boiling products. The ethyl-1-chloro-2-butadiene-1,3 was a colorless liquid of characteristic odor, $$B_{117\ mm}.\ 68.2-69°\ C.;\ N\frac{20°\ C.}{D}\ 1.4770;\ D\frac{20°\ C.}{4°\ C.}\ 0.9390.$$

A small amount of hydroquinone was added to prevent spontaneous polymerization on standing.

The modifications as to time, temperature, concentration of acid, catalyst, and experimental conditions described under Example I apply also to ethyl-1-chloro-2-butadiene-1,3. The procedure outlined above is merely the preferred method of operation, and strict adherence to the conditions there described is unnecessary.

EXAMPLE III

*Butyl-1-chloro-2-butadiene-1,3*

37.8 g. of butyl-1-vinyl-2-acetylene was placed in a pressure bottle containing a mixture composed of 66 cc. concentrated hydrochloric acid (sp. gr. 1.19), 9.8 g. cuprous chloride, and 7 g. ammonium chloride. Poor yields of butyl-1-chloro-2-butadiene-1,3 resulted when this mixture was shaken at 45° C. for five hours or at lower temperatures for this length of time. Hence, the bottle was agitated at 65° C. for 16 hours, and the contents distilled with steam. The non-aqueous layer was separated, dried with calcium chloride, a small amount of hydroquinone was added, and the liquid distilled in a vacuum. The distillate consisted of unchanged butyl-1-vinyl-2-acetylene and the new compound, butyl-1-chloro-2-butadiene-1,3. This compound was a colorless liquid of characteristic odor, $$B_{18\ mm}.\ 64-65°\ C.;\ N\frac{20°\ C.}{D}\ 1.4794;\ D\frac{20°\ C.}{4°\ C.}\ 0.9366.$$

A small amount of hydroquinone was added to prevent spontaneous polymerization.

The modifications as to time, temperature, concentration of acid, catalyst, and experimental conditions discussed under Example I apply also to butyl-1-chloro-2-butadiene-1,3.

EXAMPLE IV

*Heptyl-1-chloro-2-butadiene-1,3*

For the preparation of this compound I prefer to use a non-aqueous solvent and a higher temperature than in the preceding examples.

Two hundred (200) cc. of 95% ethyl alcohol was saturated with dry hydrogen chloride. The increase in weight amounted to 60 g. This solution was then added to a mixture consisting of 70 grams heptyl-1-vinyl-2-acetylene, 12 g. ammonium chloride, and 16 g. cuprous chloride. The mixture was agitated in a pressure bottle at 70°–80° C. for 5 hours. Water was added and the upper layer separated. This was dried with calcium chloride and distilled in a vacuum. The distillate consisted of unchanged heptyl-1-vinyl-2-acetylene and the new compound, heptyl-1-chloro-2-butadiene-1,3. This compound was a colorless liquid, $$B_{1\ mm}.\ 74-76°\ C.;\ N\frac{20°\ C.}{D}\ 1.4785;\ D\frac{20°\ C.}{4°\ C.}\ 0.9141.$$

The modifications as to time, temperature, concentration of acid, catalyst, and experimental conditions discussed under Example I apply also to heptyl-1-chloro-2-butadiene-1,3. A variety of solvents can be employed and the reaction can be conducted with or without catalysts.

Although when freshly prepared and in the monomeric form, these compounds are mobile liquids, they possess the property of polymerizing readily. At ordinary temperatures and in the absence of catalysts, the polymerization proceeds slowly. By means of light, the process can be accelerated considerably. During the polymerization the liquids increase in viscosity and in density. The final products are elastic, resilient solids, resembling rubber and having very little plasticity. Plastic products, however, are readily obtained by separating the polymer from partially polymerized material. Thus the R-substituted chlorobutadiene may be allowed to polymerize until it reaches the stage of a viscous liquid or a soft jelly. In the case of methyl-1-chloro-2-butadiene-1,3 and ethyl-1-chloro-2-butadiene-1,3 this transformation takes place in approximately one month under a 150-watt Mazda light. Butyl-1-chloro-2-butadiene-1,3 and heptyl-1-chloro-2-butadiene-1,3 polymerize somewhat more slowly under the same conditions. The polymer in the viscous liquid or soft jelly may be separated from the unchanged monomer by precipitation or distillation. The polymer obtained in this way is soft and plastic, and by the action of heat it is further converted into non-plastic, elastic material resembling soft, cured, natural rubber. Thus it is possible by suitably regulating the conditions under which the polymerization is effected, to obtain not only rubber-like polymers having various degrees of solubility, plasticity, elasticity, and strength, but also other types of polymers such as readily mobile liquids, viscous liquids, soft sticky masses, and hard, tough masses.

I wish to have it understood that the term "polymer" as applied to the products obtained by polymerizing 1-substituted-chloro-2-butadiene-1,3 does not indicate a single chemical individual composed of identically similar molecules but a whole series of materials whose molecules have been formed by the combination of various numbers of 1-substituted-chloro-2-butadiene-1,3 molecules with each other. Small amounts of other materials, e. g., oxygen from the air, may participate in the formation of these larger molecules, and molecules of different sizes may be present in different proportions in different samples.

As a result the polymers of any given 1-substituted-chloro-2-butadiene-1,3 constitute a continuous series of materials covering a wide range of properties, the successive members of which may be practically indistinguishable. For this reason it is not possible to distinguish sharply all the different types of polymers in terms of their properties. Although the following examples illustrate methods of preparing plastic and rubber-like polymers, as well as methods of curing certain of the rubber-like polymers in order to obtain synthetic rubber, they are to be regarded merely as illustrations. Wide divergence from the procedures outlined is possible without affecting the essential characteristics of the invention.

EXAMPLE V

A sample of methyl-1-chloro-2-butadiene-1,3 was exposed at room temperature to an ordinary incandescent light (150-watt Mazda) for one month. During this period the liquid increased in viscosity—slowly at first, but more rapidly later—until a soft, transparent, elastic, rubber-like solid was obtained. The rubber-like solid was macerated with alcohol to remove monomer and polymers of low molecular weight. The residual polymer was a tough, rubbery, plastic material. Ten per cent by weight of zinc oxide was incorporated into the mass by means of steel rolls and the plastic mass then heated at 120° C. for 20 minutes. A sheet of artificial rubber was thereby obtained which resembled cured natural rubber in many of its properties.

EXAMPLE VI

A sample of ethyl-1-chloro-2-butadiene-1,3 was exposed to light and treated as in Example V. A rubber-like product of similar properties was obtained.

EXAMPLE VII

A sample of methyl-1-chloro-2-butadiene-1,3 was exposed to a 150-watt Mazda light at 30–35° C. for 6.5 weeks. The liquid progressively increased in viscosity until finally a pale-yellow rubbery solid was obtained. This product was more completely polymerized than the product of Example V. The polymer was highly elastic and resembled cured natural rubber.

EXAMPLE VIII

A sample of butyl-1-chloro-2-butadiene-1,3 was exposed to a 150-watt Mazda light at 30–35° C. After 5 weeks, the product was a soft, sticky, transparent solid.

EXAMPLE IX

A sample of butyl-1-chloro-2-butadiene-1,3 was submitted to a pressure of 6,000 atmospheres at 38° C. At the end of 96 hours it had polymerized to a transparent, soft, sticky solid. Ninety per cent of this solid was now insoluble in alcohol. The portion insoluble in alcohol was mixed with 10% of its weight of zinc oxide, 2% of stearic acid, and 1% of benzidine and then heated at 120° C. until cured.

EXAMPLE X

A sample of heptyl-1-chloro-2-butadiene-1,3 was exposed to a 150-watt Mazda light at 30–35° C. After 3 weeks, the product was a colorless, very viscous liquid.

EXAMPLE XI

A sample of heptyl-1-chloro-2-butadiene-1,3 was submitted to a pressure of 6,000 atmospheres at 38° C. At the end of 96 hours, it had polymerized to a transparent, sticky, elastic mass. Only 4% of the material was soluble in alcohol. The alcohol-insoluble polymer was incorporated with 10% of zinc oxide, 2% of stearic acid, and 1% of benzidine and heated at 120° C. until cured.

It should be pointed out that the rate of polymerization and the type of polymer obtained are greatly affected by various factors such as the temperature, pressure, amount of oxygen present, type of light employed, distance from the light source, presence or absence of catalysts, and the presence or absence of solvents. Temperature has a marked effect upon the rate of polymerization. Thus, while methyl-1-chloro-2-butadiene-1,3 polymerizes in about one month at 25° C. under the conditions described in Example V, a much longer time is required at −10° C. On the other hand, above 25° C. the rate of polymerization increases progressively with the temperature. Similarly, the type of light employed affects the rate of polymerization to a marked extent. Thus, a powerful mercury arc (in quartz) effects much more rapid polymerization than does an ordinary Mazda light. If the material is contained in a transparent quartz vessel, polymerization proceeds more rapidly than in a Pyrex glass vessel. The distance of the material from a given light source also is a factor. Thus, at a distance of 12 inches, polymerization of a 1-substituted-chloro-2-butadiene-1,3 proceeds more rapidly than at a distance of 24 inches. The rate of polymerization is also greatly increased by the presence of oxygen (or air). In the complete absence of oxygen, polymerization is retarded. Similarly, if exposure is made in an inert atmosphere, for example, nitrogen or carbon dioxide, the rate of polymerization is decreased.

The great accelerating effect of pressure on the rate of polymerization is illustrated by Examples IX and XI. In general, the use of pressure leads to the formation of tougher, harder, and stronger rubber-like products. By the use of pressure, it is possible to obtain directly from a 1-substituted-chloro-2-butadiene-1,3 in a single operation, a finished and completely cured rubber article exactly conforming in shape to the container used.

The accelerating effects of oxygen, heat, light, and pressure have already been disclosed. For certain purposes, it is desirable to augment the speed of polymerization still further or to employ other means of accelerating the polymerization. For this purpose certain catalysts such as the peroxides may be employed. Among these may be mentioned ozone, benzoyl peroxide, or oxidized turpentine, and inorganic peroxides such as sodium peroxide, lead peroxide, and hydrogen peroxide. In general, any quantity of the catalyst may be employed and the rate of polymerization will be proportional to the quantity of catalyst present. Inasmuch as each catalyst has a different effect upon the rate of polymerization, the quantity of catalyst necessary to produce a definite rate of polymerization will vary with the particular catalyst employed.

As described above, there is a continuous change in properties during the polymerization of 1-substituted-chloro-2-butadienes-1,3 until the reaction is complete. The special properties of these more or less incompletely polymerized mixtures of a given 1-substituted-chloro-2-butadiene-1,3 may make it desirable to use them as such. Thus, the partially polymerized mixtures of methyl-1-chloro-2-butadiene-1,3 and its polymers are adapted for use as adhesives or as coating compositions. Partially polymerized mixtures of the other R-substituted-chloro-2-butadienes-1,3 and their polymers, described above may be similarly employed. Such materials readily wet cloth or glass, for example, and when spread in a thin film harden to form a tough, elastic, tightly adhering rubber-like coating. When a partially polymerized 1-substituted-chloro-2-butadiene-1,3 is spread on a smooth surface and allowed to further polymerize, the resulting thin film may be stripped from the surface by suitable means to obtain the polymer in the form of a tough, elastic sheet. It is also feasible to incorporate fillers and modifying agents into the plastic curable masses by the well-known methods employed for the treatment of unvulcanized rubber, such as for example by means of differential rolls. Among the various fillers and modifying agents which can be added are the usual diluting, reinforcing, cheapening, retarding, accelerating or antioxidant materials employed with natural rubber. Such materials are zinc oxide, zinc dust, lithopone, blanc fixe, clay, iron oxide, whiting, lime, magnesium carbonate, carbon, slate flour, pine tar, mineral oil, paraffin, mineral rubber, vulcanized oil, rosin, diphenyl guanidine, sulfur, phenyl beta naphthylamine, fatty acids, cork dust, ground leather, cotton, sawdust, and asbestos. The amount and nature of the material added to the plastic polymer of course depends upon the properties which it is desired to impart to the final mixture.

The plastic polymers after being brought to a suitable consistency are shaped by the usual methods employed with natural rubber such as milling or calendering into sheets, spreading on fabric, extruding to form tubing, or by molding. After milling is completed the product is ready to be further polymerized or cured in the form of shaped articles. In cured form, the polymerized 1-substituted-chloro-2-butadienes-1,3 are tough, elastic, and resilient. They are thus adapted for use as general substitutes for rubber and hence are suitable materials for coverings, erasers, hose, tires, pneumatic containers, shock absorbents, elastics, tubings, sheets and gaskets, stoppers, electrical insulators, etc.

In addition to the above procedures for preparing partially and completely polymerized 1-substituted-chloro-2-butadienes-1,3, I have also discovered other methods of controlling the polymerization so as to obtain rubber-like products of desirable plasticity and solubility. Thus it has been found that by polymerizing the 1-substituted-chloro-2-butadienes-1,3 in the presence of solvents the polymerization may be readily controlled to yield solutions of rubber-like polymers. By employing a volatile solvent and allowing the solvent to evaporate or distill from such solutions at the proper stage of polymerization, it is possible to isolate the rubber-like polymer as such in a plastic form capable of being fabricated or dissolved. The presence of a solvent in the polymerization of a 1-substituted-chloro-2-butadiene-1,3 also produces other useful effects as more fully described below. The amount of solvent to be employed will of course vary within wide limits depending upon the results desired in the given instance and also depending upon the nature of the solvent employed. Solvents suitable for use may be divided into several classes according to the effect produced as indicated below.

Thus, if the boiling point of an inert solvent is not above 200° C. and the solvent is adapted to dissolve not only the 1-substituted-chloro-2-butadiene-1,3 but also the resulting 1-substituted-chloro-2-butadiene-1,3 polymer, it is possible to obtain homogeneous solutions of the polymers from which the solvent may be separated by evaporation or distillation. The solutions are adapted for use as cements or binding agents or as impregnating or coating compositions since upon evaporation of the solvent, the 1-substituted-chloro-2-butadiene-1,3 polymer will remain as such. Solutions of this type are, moreover, readily mixed with dyes, fillers, antioxidants, etc. Among the solvents of this type may be mentioned benzene, toluene, xylene, cymene, ethyl ether, carbon tetrachloride, turpentine, ethylene chloride, pyridine, and carbon disulfide.

A second class of solvents is composed of liquids which are solvents for the polymer as well as for the 1-substituted-chloro-2-butadiene-1,3, just as in the first case but which are non-volatile, i. e., the boiling point is above 200° C. The practical distinction between the solvents of this type and those first mentioned is that those of the first class can be readily and completely removed by evaporation and those of the second class cannot be so removed. The solvents in the second class will ordinarily remain with the polymer and permanently modify its properties. When present in sufficient amounts they function as softeners, plasticizers, or lubricants and so modify the character of the polymer as to make it capable of being fabricated or mixed with other ingredients. Among such solvents may be mentioned spindle oil, machine oil, refined mineral oil, vaseline, diphenyl ether, ethyl benzoate, camphor, cottonseed oil, linseed oil, corn oil, coconut oil, soya bean oil, cod liver oil, and tricresyl phosphate. In general, such solvents do not have an appreciable softening or plasticizing effect when present in small amounts but function chiefly as inert fillers. When present in larger amounts they soften and plasticize the product.

Another class of solvents adapted for use is composed of liquids which are solvents for the 1-substituted-chloro-2-butadiene-1,3 and are themselves capable of being polymerized. Solutions formed with such solvents present the possibility of producing a mixture composed of the polymers of a 1-substituted-chloro-2-butadiene-1,3 together with the polymers of the solvent. Moreover, where the molecules of the solvent actually react with the molecules of a 1-substituted-chloro-2-butadiene-1,3 it is possible to form a polymeric compound chemically different from the product which might be obtained by an admixture of the individually formed polymers. Such polymerizable solvents as isoprene, styrene, China-wood oil, iodene, vinyl acetylene, vinyl acetate, and divinyl acetylene can be employed. The exact chemical structure of the resulting products is uncertain.

A fourth type of solvent includes liquids which are solvents for the 1-substituted-chloro-2-butadiene-1,3 but are not solvents for the polymer. Thus, methyl-1-chloro-2-butadiene-1,3 and the other 1-substituted-chloro-2-butadienes-1,3 are soluble in ethyl alcohol but the polymers are not. The latter therefore tend to separate from the alcohol as fast as they are formed.

In carrying out the polymerization of a 1-substituted-chloro-2-butadiene-1,3 in solution, the 1-substituted-chloro-2-butadiene-1,3 is dissolved in the selected solvent and the solution then subjected to those conditions adapted to give the desired product. Thus, the solution may be permitted to stand at ordinary temperatures in the presence of air, or if it is desired to accelerate the polymerization, the solution may be exposed to direct light, or heated, or subjected to pressures above atmospheric. The polymerization may be still further accelerated by the use of peroxides or other catalysts as already described.

For certain purposes it is desirable to use the 1-substituted-chloro-2-butadiene-1,3 as such and in unpolymerized form, and for other purposes to interrupt the polymerization after it has progressed to a given stage. It has been found that the polymerization can be retarded or largely prevented or, alternatively, that an effective control of the polymerization can be secured to the end that products of the desired type may be obtained if there is added to the 1-substituted-chloro-2-butadiene-1,3 prior to the polymerization or in certain stages of the polymerization small amounts of certain compounds hereafter designated as "inhibitors". A large number of compounds are adapted to exert this function in varying degrees. Among such compounds may be mentioned hydroquinone, iodine, catechol, pyrogallol, trinitrobenzene, benzoquinone, p-thiocresol, tributyl amine, and triethyl amine. The amount of inhibitor employed will of course vary depending upon the effectiveness of the given compound and the result desired. An amount sufficient to saturate the 1-substituted-chloro-2-butadiene-1,3 may be employed for maximum effects when the inhibitor is only slightly soluble. On the other hand appreciable effects may be obtained from the use of quantities as low as 0.1% of the weight of the 1-substituted-chloro-2-butadiene-1,3.

In carrying out the process, the inhibitor is thoroughly admixed with the 1-substituted-chloro-2-butadiene-1,3 which is either then stored for later use or is at once subjected to the desired process of polymerization. Alternatively, partial polymerization of the 1-substituted-chloro-2-butadiene-1,3 may first be effected after which the inhibitor may be added to retard or prevent further polymerization until desired. This latter procedure affords a convenient method of storing partially polymerized solutions. By a careful control of the conditions of polymerization and the amount of inhibitor employed, products of varying properties may be produced. By this means it is possible to obtain a plastic rubber-like mass capable of being dissolved by benzene and readily rolled out into a thin coherent sheet on a rubber mill. Or, conversely, it is possible to obtain a tough rubber-like material or to obtain a viscous non-volatile liquid polymer. Such products, when exposed to air over a considerable period of time, evidence appreciable resistance to deterioration and tend to retain their original appearance. It is obvious that inhibitors can be employed in combination with any of the conditions already described above for promoting or accelerating polymerization. In general, the solid polymers produced in the presence of inhibitors are softer, more completely plastic, and more soluble than those produced under the same conditions in the absence of inhibitors. Particularly is this true, if the polymer is isolated by allowing unchanged 1-substituted-chloro-2-butadiene-1,3 to evaporate or by allowing it to distill, preferably in a vacuum or with the aid of steam, or by any other suitable means such as precipitation before the polymerization is complete, i. e., before substantially all the 1-substituted-chloro-2-butadiene-1,3 has polymerized.

The addition of an inhibitor to an unpolymerized or partially polymerized 1-substituted-chloro-2-butadiene-1,3 not only control the subsequent further polymerization but also results in the formation of polymer products containing the inhibitor. In such mixtures the inhibitor functions to preserve the product and imparts to it greater stability and permanence.

As in the case of natural rubber, it is desirable in many cases to employ or treat the polymerization product of a 1-substituted-chloro-2-butadiene-1,3 in the form of an emulsion rather than in the form of a coagulated rubber. Such an emulsion can be prepared by shaking or stirring the 1-substituted-chloro-2-butadiene-1,3 with water containing an emulsifying agent such as sodium oleate. In this state it polymerizes more rapidly and the polymer remains suspended or emulsified and constitutes an artificial latex from which the synthetic rubber may be obtained by the methods commonly employed with natural latex as, for example, by adding a little acetic acid or by allowing the water to evaporate. In place of sodium oleate, emulsifying agents of many types known to the art may be employed, such as potassium oleate, triethanol amine oleate, sulfonated castor oil, sodium salt of sulfonated petroleum, ordinary soap, and magnesium linoleate.

Emulsification of the 1-substituted-chloro-2-butadiene-1,3 may be readily brought about by mechanical stirring at high speed. Other methods for the emulsification may also be used as, for example, passage through a so-called colloid mill or vigorous shaking in a closed container. If desired, the emulsion before or after polymerization may be passed through any of the commonly employed homogenizers such as suitable filters. The latices of completely polymerized 1-substituted-chloro-2-butadiene-1,3, if spread in a thin layer under conditions permitting the removal of the contained water, yield coherent films. These latices are adapted for use as coating compositions as well as for the production of sheets and thin-walled articles such as rubber gloves and pneumatic containers. Moreover, absorbent material such as cloth or paper may be impregnated with the latex and when allowed to dry, yield new water-proof fabrics and compositions.

The accelerating effects of light, heat, pressure, and catalysts have already been disclosed. In general, the same effects are observed when an emulsified 1-substituted-chloro-2-butadiene-1,3 is exposed to these conditions. It is also feasible to employ inhibitors of the type already described when the polymerization is carried out with the 1-substituted-chloro-2-butadiene-1,3 in the form of an emulsion. The use of such inhibitors not only considerably increases the time required to complete the polymerization but also has a considerable effect on the properties of the completely polymerized product. Other materials capable of prolonging the life of the synthetic rubber on exposure to air may be added either before or after the polymerization. Such substances include the ordinary rubber antioxidants:

Aromatic amines such as aniline, phenyl-beta-naphthylamine, and diphenyl ethylene diamine, phenols such as p-hydroxy diphenyl and hydroquinone, and the natural rubber antioxidants which may be extracted from various natural rubbers by means of acetone, for example. These function by inhibiting the oxidation of the polymers of the 1-substituted-chloro-2-butadiene-1,3. In addition to these, a class of compounds known as acid acceptors, that is basic substances and other substances capable of combining with acids, also act as preservatives for the synthetic rubber by combining with traces of hydrogen chloride which may be formed in the rubber under certain conditions, and which in the free state, would cause deterioration of the rubber. These include alkalies such as sodium hydroxide and sodium carbonate, basic oxides such as zinc oxide, and soaps such as sodium oleate. It will be seen that many of these preservatives for the synthetic rubber also belong to other classes of substances used in this preparation of the synthetic latex, and may, therefore, serve a double purpose. Thus many of the antioxidants are also inhibitors of polymerization while many acid acceptors also function as stabilizers of the emulsion against spontaneous coagulation (sodium carbonate), or as pigments (zinc oxide), or as emulsifying agents (sodium oleate). If soluble, the synthetic rubber preservative may be dissolved directly in the water of the emulsion and remain with the rubber on evaporation. If insoluble, dispersions of the preserving agent in water may be used.

In some instances, the addition of protective colloids, proteins and resins to the emulsion before or after polymerization of the 1-substituted-chloro-2-butadiene-1,3 favorably affects the properties of the rubber obtained therefrom. Among such materials may be mentioned, for example, proteins such as glue, casein, gelatin, egg albumen, blood serum, milk serum, pectins, gum arabic, gum tragacanth, and resins such as the resin isolated from guayule rubber by acetone extraction.

It is also feasible to incorporate in the 1-substituted-chloro-2-butadiene-1,3 before or after emulsification, certain diluents or solvents which tend to impart to the final product a greater degree of softness, elasticity, and pliability. Among such diluents may be mentioned by way of example, cottonseed oil, refined paraffin base mineral oil, and spindle oil. Likewise such fillers and pigments as carbon black, zinc oxide, whiting, clay, etc., are often desirable ingredients and may be added to the emulsion before or after complete polymerization.

The invention is capable of a great many modifications and variations. Any departures from the above description and specific illustrations which conform to the spirit of the invention are intended to be included within the scope of the claims.

I claim:
1. Chemical compounds having the formula

$$CH_2=CH-C(X)=CHR$$

in which X is a halogen atom and R is an organic radical.

2. Chemical compounds having the formula $$CH_2=CH-C(X)=CHR$$

in which X is a halogen and R is a hydrocarbon radical.

3. Chemical compounds having the formula $$CH_2=CH-C(X)=CHR$$

in which X is a halogen and R is an aliphatic radical.

4. Chemical compounds having the formula $$CH_2=CH-C(Cl)=CHR$$

in which R is an organic radical.

5. Chemical compounds having the formula $$CH_2=CH-C(Cl)=CHR$$

in which R is a hydrocarbon radical.

6. Chemical compounds having the formula $$CH_2=CH-C(Cl)=CHR$$

in which R is an aliphatic radical.

7. Chemical compounds having the formula $$CH_2=CH-C(Cl)=CHR$$

in which R is an alkyl radical.

8. Methyl-1-chloro-2-butadiene-1,3.
9. Ethyl-1-chloro-2-butadiene-1,3.
10. Butyl-1-chloro-2-butadiene-1,3.
11. The process of preparing chemical compounds which comprises reacting a hydrogen halide and a compound having the formula $$CH_2=CH-C\equiv C-R$$

in which R is an organic radical.

12. The process of preparing chemical compounds which comprises reacting a hydrogen halide and a compound having the formula $$CH_2=CH—C\equiv C—R$$

in which R is a hydrocarbon radical.

13. The process of preparing chemical compounds which comprises reacting a hydrogen halide and a compound having the formula $$CH_2=CH—C\equiv C—R$$

in which R is an aliphatic radical.

14. The process of preparing chemical compounds which comprises reacting hydrogen chloride and a compound having the formula $$CH_2=CH—C\equiv C—R$$

in which R is an organic radical.

15. The process of preparing chemical compounds which comprises reacting hydrogen halide in the presence of a solvent for the hydrogen halide with a compound having the formula $$CH_2=CH—C\equiv C—R$$

in which R is an organic radical.

16. The process of preparing chemical compounds which comprises reacting hydrogen chloride in the presence of a solvent for the hydrogen chloride with a compound having the formula $$CH_2=CH—C\equiv C—R$$

in which R is an organic radical.

17. The process of preparing chemical compounds which comprises reacting hydrochloric acid in the form of a concentrated aqueous solution with a compound having the formula $$CH_2=CH—C\equiv C—R$$

in which R represents a hydrocarbon radical, in the presence of a metallic halide.

18. A polymer of a compound having the formula $$CH_2=CH—C(X)=CHR$$

in which X is a halogen atom and R is an organic radical.

19. The polymer described in claim 18 in which X is a chlorine atom.

20. The polymer described in claim 18 in which R is a hydrocarbon radical.

21. The polymer described in claim 18 in which X is a chlorine atom and R is a hydrocarbon radical.

22. A rubber-like polymer of a compound having the formula $$CH_2=CH—C(X)=CHR$$

in which X is a halogen atom and R is an organic radical.

23. The polymer described in claim 22 in which X is a chlorine atom.

24. The polymer described in claim 22 in which X is a chlorine atom and R is a hydrocarbon radical.

25. A plastic polymer of a compound having the formula $$CH_2=CH—C(X)=CHR$$

in which X is a halogen atom and R is an organic radical.

26. The polymer described in claim 25 in which X is a chlorine atom.

27. The polymer described in claim 25 in which X is a chlorine atom and R is a hydrocarbon radical.

28. A polymer of methyl-1-chloro-2-butadiene-1,3.

29. A polymer of ethyl-1-chloro-2-butadeine-1,3.

30. A polymer of butyl-1-chloro-2-butadeine-1,3.

31. The process which comprises polymerizing a compound having the formula $$CH_2=CH—C(X)=CHR$$

in which X is a halogen atom and R is an organic radical.

32. The process of claim 31 in which R is a hydrocarbon radical.

33. The process of claim 31 in which X is a chlorine atom.

34. The process which comprises polymerizing a compound having the formula $$CH_2=CH—C(X)=CHR$$

in which X is a halogen atom and R is an organic radical, and discontinuing the polymerization when a substantial amount of the compound has been polymerized to the plastic state.

35. The process of making rubber-like articles which comprises curing a plastic polymer of a compound having the formula $$CH_2=CH—C(X)=CHR$$

in which X is a halogen atom and R is an organic radical.

36. The process of claim 35 in which X is a chlorine atom.

37. The process of claim 35 in which R is a hydrocarbon radical.

RALPH A. JACOBSON.